(12) United States Patent
Dell'Orco et al.

(10) Patent No.: US 8,110,131 B1
(45) Date of Patent: Feb. 7, 2012

(54) CARPET RECLAMATION SYSTEM

(76) Inventors: Sergio Dell'Orco, Capalle (IT); Frank J. Levy, Quogue, NY (US)

( * ) Notice: Subject to any disclaimer, the term of this patent is extended or adjusted under 35 U.S.C. 154(b) by 325 days.

(21) Appl. No.: 11/634,551

(22) Filed: Dec. 6, 2006

(51) Int. Cl.
B29B 9/02 (2006.01)
(52) U.S. Cl. ........................ 264/141; 264/913
(58) Field of Classification Search ............... 264/36.1, 264/36.11, 37.1, 37.28, 115, 118, 122, 140, 264/141, 913
See application file for complete search history.

(56) References Cited

U.S. PATENT DOCUMENTS

| | | | | |
|---|---|---|---|---|
| 3,535,744 | A * | 10/1970 | Reise | 19/2 |
| 3,797,073 | A * | 3/1974 | Fairfield | 19/83 |
| 3,974,020 | A * | 8/1976 | Logan et al. | 156/435 |
| 4,028,159 | A | 6/1977 | Norris | |
| 4,909,266 | A * | 3/1990 | Massa | 134/60 |
| 5,013,367 | A * | 5/1991 | Butts | 134/9 |
| 5,169,870 | A | 12/1992 | Corbin | |
| 5,230,473 | A * | 7/1993 | Hagguist et al. | 241/3 |
| 5,457,197 | A | 10/1995 | Sifniades | |
| 5,497,949 | A | 3/1996 | Sharer | |
| 5,518,188 | A | 5/1996 | Sharer | |
| 5,535,945 | A | 7/1996 | Sferrazza | |
| 5,656,757 | A | 8/1997 | Jenczewski | |
| 5,681,952 | A | 10/1997 | Sifniades | |
| 5,722,603 | A * | 3/1998 | Costello et al. | 241/20 |
| 5,926,918 | A * | 7/1999 | Snell et al. | 19/65 R |
| 5,952,660 | A * | 9/1999 | Kip et al. | 250/339.11 |
| 6,029,916 | A | 2/2000 | White | |
| 6,036,726 | A * | 3/2000 | Yang et al. | 8/102 |
| 6,059,207 | A * | 5/2000 | Costello et al. | 241/24.12 |
| 6,061,876 | A * | 5/2000 | Rowe | 19/98 |
| 6,126,096 | A | 10/2000 | Robinson | |
| 6,182,913 | B1 * | 2/2001 | Howe et al. | 241/1 |
| 6,296,795 | B1 * | 10/2001 | Buck | 264/122 |
| 6,378,179 | B1 * | 4/2002 | Hirsch | 28/103 |
| 6,379,489 | B1 * | 4/2002 | Goulet et al. | 156/344 |

(Continued)

FOREIGN PATENT DOCUMENTS

DE 3032477 A * 3/1981

(Continued)

OTHER PUBLICATIONS

Anonymous RD 388013, Separation process, Aug. 1996, Research Disclosure 38813.*

(Continued)

Primary Examiner — Joseph Del Sole
Assistant Examiner — Ryan Ochylski
(74) Attorney, Agent, or Firm — Thomas A. O'Rourke; Bodner & O'Rourke, LLP

(57) ABSTRACT

A method an apparatus for reclaiming face fibers and polypropylene and/or polyvinyl chloride backing material from rolls and pieces of post-consumer carpet. The system includes a separator for separating the face fibers from the backing and for separating latex and carbon calcium powder from polypropylene backing. An extruder is provided for extruding the face fibers separated from the backing into extrusions, and a pelletizer pelletizes the extrusions. A roller opener opens the polypropylene backing into fibrous portions and also cleans such fibrous portions. Alternately, a granulator can be provided that chops and grinds the polypropylene or PVC backing into fragments after the separation of the face fibers from the backing. A heat source heats the PVC fragments, and also the polypropylene fragments (thereby separating the latex therefrom), and ultimately melts such fragments. Reclaimed fibers can be pelletized, made into extrusions, used in non-woven products and in other manners.

5 Claims, 15 Drawing Sheets

U.S. PATENT DOCUMENTS

| | | | |
|---|---|---|---|
| 6,398,138 B1 | 6/2002 | Robinson | |
| 6,589,294 B2* | 7/2003 | Hortel et al. | 8/137.5 |
| 6,698,325 B1* | 3/2004 | Sprandel | 83/168 |
| 6,752,336 B1 | 6/2004 | Wingard | |
| 6,814,826 B1* | 11/2004 | Bell | 156/94 |
| 6,953,119 B1* | 10/2005 | Wening | 209/3.3 |
| 7,635,099 B1* | 12/2009 | Meredith et al. | 241/21 |
| 7,784,719 B1* | 8/2010 | Wingard | 241/20 |
| 8,017,662 B2* | 9/2011 | Hoover et al. | 521/49.8 |
| 2003/0075824 A1* | 4/2003 | Moore et al. | 264/143 |
| 2003/0111606 A1* | 6/2003 | Berghmans et al. | 250/339.07 |
| 2004/0088829 A1* | 5/2004 | Atkinson | 19/98 |
| 2006/0070188 A1* | 4/2006 | Mauldin et al. | 8/102 |
| 2008/0128933 A1* | 6/2008 | Przybylinski et al. | 264/31 |

FOREIGN PATENT DOCUMENTS

| | | | |
|---|---|---|---|
| DE | 4228301 A1 * | 4/1993 | |
| JP | 05132825 A * | 5/1993 | |
| JP | 2001062832 A * | 3/2001 | |
| SU | 411049 A * | 6/1974 | |
| WO | 0131096 A1 | 5/2001 | |
| WO | WO 03018897 A1 * | 3/2003 | |

OTHER PUBLICATIONS

Appendix A, Descriptions of the 25 Case Studies, pp. A-1-A-118 from Lempert, R. J. et al., Next Generation Environmental Technologies: Benefits and Barriers, Santa Monica, Calif: RAND Corporation, MR-1682-OSTP, 2003. As of Dec. 7, 2010: http://www.rand.org/pubs/monograph_reports/MR1682.

Background Document for the Final Comprehensive Procurement Guideline (CPG) III and Final Recovered Materials Advisory Notice (RMAS) III, copyright 1999, U.S. Environmental Protection Agency, Office of Solid Waste, EPA-530-R-00-002.

Bally Ribbon Mills, Glossary of Common Textile Terms, "Selvage" definition, copyright Dec. 2010.

Carpet America Recovery Effort (CARE) Annual Report 2003, copyright Apr. 2004, pp. 1-28. As of Dec. 7, 2010: http://www.carpetrecovery.org/pdf/annual_report/03_CARE-annual-rpt.pdf.

Carpet America Recovery Effort (CARE) Annual Report 2004, copyright May 2005. As of Dec. 7, 2010: http://www.carpetrecovery.org/pdf/annual_report/04_CARE-annual-rpt.pdf.

Carpet America Recovery Effort (CARE) Annual Report 2005, copyright May 2006, pp. 1-44. As of Dec. 7, 2010: http://www.carpetrecovery.org/pdf/annual_report/05_CARE-annual-rpt.pdf.

Carpet America Recovery Effort Annual Report, copyright 2002, pp. 1-29. As of Dec. 7, 2010: http://www.carpetrecovery.org/pdf/annual_report/02_CARE-annual-rpt-pdf.

Carpet Recycling Facts and Figures, copyright Jun. 2004, PowerPoint slide show, Fifth Annual World Conference, Duesseldorf, Germany.

Celanese Acetate, Complete Textile Glossary, "SELVAGE or SELVEDGE" definition, copyright 2001, Celanese Acetate, LLC.

Current Status of Product Stewardship for Carpet, copyright Feb. 2000, Midwestern Workgroup on Carpet Recycling. As of Dec. 7, 2010: http://www.greenbiz.com/sites/default/files/document/O16F29644.pdf.

DellOrco andVillani Designs New Fiber-Opening Concept, copyright Feb. 2001, Textile World web page. As of Dec. 7, 2010: http://www.textileworld.com/Articles/2001/February/New_Products/DellOrcoandVillani_Designs_New_Fiber-Opening_Concept.html.

Eighth Annual Conference on Recycling of Fibrous Textile and Carpet Waste, copyright May 2003, Conference Program, North West Georgia Trade & Convention Center, Dalton, GA, USA. As of Dec. 7, 2010: http://www.tfe.gatech.edu/recycle_conf/8th_5-03.pdf.

Fifth Annual Conference on Recycling of Fibrous Textile and Carpet Waste, copyright May 2000, Program, North West Georgia Trade & Convention Center, Dalton, GA USA As of Dec. 7, 2010: http://www.tfe.gatech.edu/recycle_conf/5th_5-00.pdf.

Fourth Annual Conference on Recycling of Fibrous Textile and Carpet Waste, copyright May 1999, Northwest Georgia Trade & Convention Center, Dalton, GA USA. As of Dec. 7, 2010: http://www.tfe.gatech.edu/recycle_conf/4th_5-99.pdf.

Levy, F. J., et al., New Technology for Opening Textile Waste, Fifth Annual Conference on Recycling of Fibrous Textile and Carpet Waste, copyright May 2000, PowerPoint slide show, North West Georgia Trade & Convention Center, Dalton, GA, USA. As of Dec. 7, 2010: http://smartech.gatech.edu/bitstream/handle/1853/10776/5th_15_levy.pdf;jsessionid=E0727497D40E8AABEC0305871EB914B6.smart1?sequence=1.

Muzzy, J., Recycling Post-Consumer Carpet, copyright 2005, Global Plastics Environmental Conference (GPEC 2005): Creating Sustainability for the Environment, Proceedings of a Society of Plastics Engineers ( SPE ) meeting held Feb. 23-25, 2005 Atlanta Georgia, USA. As of Dec. 7, 2010 http://www.sperecycling.org/GPEC/GPEC2005/papers/Paper_04.pdf.

Ninth Annual Conference on Recycling of Fibrous Textile and Carpet Waste, copyright May 2004, Program, North West Georgia Trade & Convention Center, Dalton, GA, USA. As of Dec. 7, 2010: http://www.tfe.gatech.edu/recycle_conf/9th_5-04.pdf.

NTC Project: SO3-PH01, Sustainability as a Source of Competitive Advantage, copyright Nov. 2005, National Textile Center Annual Report, pp. 1-10.

Recycling Interior Finish Materials—Carpet and Ceiling Tiles, copyright Mar. 2003, Public Works Technical Bulletin 200-1-17. As of Dec. 7, 2010: http://www.wbdg.org/ccb/ARMYCOE/PWTB/pwtb_200_1_17.pdf.

Recycling of Fibrous Textile and Carpet Waste, Final Program, copyright Jun. 1996, School of Textile & Fiber Engineering, Georgia Institute of Technology and Consortium on Competitiveness for the Apparel, Carpet and Textile As of Dec. 7, 2010: http://www.tfe.gatech.edu/recycle_conf/1st_6.96.pdf.

Resource Conservation Challenge Strategic Plan, What Can You Save Tomorrow?, Five Year Plan, copyright Jun. 2005, pp. 1-20, United States Environmental Protection Agency. As of Dec. 7, 2010: http://www.epa.gov/osw/rcc/resources/strat-plan.pdf.

Second Annual Conference on Recycling of Fibrous Textile and Carpet Waste, copyright May 1997, The School of Textile & Fiber Engineeering, Georgia Institute of Technology, Renaissance Atlanta Hotel Downtown, Atlanta, GA, USA. As of Dec. 7, 2010: http://www.tfe.gatech.edu/recycle_conf/2nd_5-97.pdf.

Seventh Annual Conference on Recycling of Fibrous Textile and Carpet Waste, copyright May 2002, Conference Program, North West Georgia Trade & Convention Center, Dalton, GA, USA. As of Dec. 7, 2010: http://www.tfe.gatech.edu/recycle_conf/7th_5-02.pdf.

Sham-Judd, M., Carpet Waste and Carpet Fiber Recycling: A Study of Open and Closed Loop Recycling Processes, date unknown, pp. 47-70. As of Dec. 7, 2010: http://www.p2pays.org/ref/09/08622.pdf.

Sixth Annual Conference on Recycling of Polymer, Textile, and Carpet Waste, copyright Apr. 2001, Conference Program, North West Georgia Trade & Convention Center, Dalton, GA, USA. As of Dec. 7, 2010: http://www.tfe.gatech.edu/recycle_conf/6th_4-01.pdf.

Source Report: ReEntry®, copyright Jul. 2006, Bentley Prince Street, 05SRC1114SS, pp. 1-2. As of Dec. 7, 2010: http://www.bentleyprincestreet.com/Documentation/bp-ReEntrySourceReport_05SRC1114SS.pdf.

The Carpet Industry's Sustainability Report, copyright 2003, The Carpet and Rug Institute, pp. 1-27. As of Dec. 7, 2010: http://www.carpet-rug.org/pdf_word_docs/03_CRI-Sustainability-Report.pdf.

Third Annual Conference on Recycling of Fibrous Textile and Carpet Waste, copyright Apr. 1998, Program. As of Dec. 7, 2010: http://www.tfe.gatech.edu/recycle_conf/3rd_4-98.pdf.

Wang, Y. et al., Recycling of Carpet and Textile Fibers, copyright 2003, pp. 697-725, Plastics and the Environment: A Handbook, Chapter 16, John Wiley & Sons, New York, USA. As of Dec. 7, 2010: http://www.prism.gatech.edu/~yw6/Fiberrecycling/Fiber%20Recycling%20Chapter%2016.pdf.

Wang, Y., Carpet Recycling Technologies, copyright Mar. 2006, pp. 1-11, School of Polymer, Textile and Fiber Engineering, Georgia Institute of Technology, Atlanta, GA USA As of Dec. 7, 2010: http://www.prism.gatech.edu/~yw6/Fiberrecycling/Recycling%20in%20Textiles%20YWang%20Ch6.pdf.

Wulfhorst, B. et al., Textile Technology, copyright Apr. 2006, pp. 74-84, Principles and Machinery for Yarn Procuction, ISBN 3-446-22963-9. As of Dec. 7, 2010: http://bilder.buecher.de/zasatz/14/14694/14694935_lese_1.pdf.

* cited by examiner

CARPET RECLAMATION SYSTEM

BACKGROUND OF THE INVENTION

This invention relates generally to a system for reclaiming face fibers and carpet backing from post-consumer carpet.

Carpet typically includes, face pile or face fiber and a backing system comprised of one or more polypropylene and/or polyvinylchloride (PVC) substrates and may have adhesive and/or latex adhesive backing for holding the face fibers in place.

Carpet that has been installed and subjected to use in residential, commercial, governmental, and industrial environments may be replaced from time to time, with the installed carpet being removed and disposed of. Such carpet is known in the industry as "post-consumer" carpet, as the carpet has been subjected to the wear and tear of use. Although the reasons for removing such post-consumer carpet may vary from application to application, the magnitude of post-consumer carpet disposed of on an annual basis is considerable. It is estimated that billions of pounds of such post-consumer carpet is disposed of annually, typically in landfills, resulting in a significant consumption of landfill space. Accordingly, a reduction of such carpet waste would be desirable.

As such post-consumer carpet often times includes fibers, polymers, and other components that can potentially be reused, it would be desirable to have a system by which the reusable components of could be reclaimed, thereby reducing landfill deposits. In particular, it would be desirable to recycle from carpet typical constituents, such as nylon, polypropylene, carbon calcium, polyvinylchloride, PVC, etc., which, in addition to conserving landfill space would also conserve valuable natural resources and potentially provide significant cost savings.

SUMMARY OF THE INVENTION

Generally, the present invention includes in one preferred embodiment a system for reclaiming the face fibers and polypropylene backing material from rolls and flat pieces of post-consumer carpet. The system includes a separator for separating the face fibers from the polypropylene backing and the adhesives and/or latex coating ordinarily found on such backing. An extruder extrudes the face fibers separated from the polypropylene backing into extrusions, and a pelletizer pelletizes such extrusions. In one embodiment, a granulator chops and/or grinds or otherwise reduces the polypropylene backing into small bits, fragments, or particles, or chips, after separation of the face fibers therefrom. Also, a device is provided for separating off the adhesives and/or latex and for melting the polypropylene backing, through the application of heat and compaction forces.

More specifically, the present invention also includes a method and apparatus for reclaiming face fibers and polypropylene and/or polyvinyl chloride (PVC) backing from post-consumer carpet. The method may include, in one preferred embodiment, sorting rolls and/or sections of post-consumer carpet by face fiber type prior to separation of such fibers from the backing. An infrared sensor may be used for assisting in such sorting step. The impurities from the face fibers, after separation from the polypropylene backing, are preferably removed, and in one preferred embodiment, a willow cleaner is used for such removal of impurities from the polypropylene opened fibers. Further, the face fibers, after separation from the backing, and after having impurities removed therefrom, can be blended with additional fibers or constituents prior to being extruded in the extruder.

With regard to the polypropylene backing and/or PVC backing, such backing, after having the face fibers separated therefrom, and being processed through a grinder, granulator, shredder, and/or a cutter, are then melted through the application of heat and pressure, is allowed to cool and harden, and is then processed into particles, fragments, or bits. These bits can be used for subsequent processing and products, and could be, for example, molded into products through injection molding, rotational molding, etc., or could be sold or reused in flakes and/or chips and/or bits or particles as a commodity for use in other manufacturing and/or commercial applications.

The present invention also includes, in one embodiment, the face fibers, after separation, extrusion, and pelletization, being used in other manufacturing and/or commercial applications, such as for molding, e.g., composite molding, injection molding, rotational molding, etc., or for other manufacturing applications, such as spinning, extrusion, etc. Such pellets could also be sold on a commodity basis to industry for other manufacturing and/or commercial purposes.

A preferred embodiment of a system constructed in accordance with the present invention includes a separator that separates the face fibers from the latex-coated polypropylene backing and an extruder that extrudes the face fibers into extrusions. A roller opener device opens the fibers of the backing to yield opened polypropylene portions. Alternately, a pelletizer machine pelletizes the extrusions, and a granulator chops the latex-coated polypropylene backing into particles, fragments or bits. Also, a heat source, which could be electric resistance heat, gas-fired heat or heat from another combustion source, solar heat, microwave energy, chemical reaction heat, etc., is provided that heats the bits sufficiently to generally melt the bits and sufficiently to generally separate, cook off, bake off, volatize and/or otherwise remove the latex therefrom.

The present invention further contemplates alternate embodiments, specifically including baling the polypropylene backing after being opened with a roller opener and/or chopped and ground in the granulator, and then disposing of such bales in a landfill. This embodiment allows for easier material handling and lower disposal volume as compared to disposing of post-consumer carpet intact. Alternately, such bales of polypropylene, latex, and/or PVC material could be sold to subsequent converters for use in other products.

In another embodiment of the present invention, such polypropylene backing material can be baled after such opening with a roller opener and/or chopping and grinding in the granulator, and then such bales subsequently opened through use of opening equipment, such as textile opening equipment, wherein such baled material is shredded, torn, and subjected to dust removal. The resulting fiber remains can be used in non-woven products, for example, singularly, or blended with other fibers, for production of non-woven products, such as insulation, sound deadening panels of other materials, batting, filler, under carpet pads, floor tiles, furniture, industrial applications such as roofing material mixed with asphalt, etc. Depending on the desired production layout, it may be possible to eliminate the baling step altogether, such that the backing with the adhesives and/or latex, after chopping and grinding, is next subjected to the opening process without the intervening baling step.

The present invention also includes a roller opener for reclaiming material from carpet backing, the roller opener including an intake that receives the carpet backing and an opener roll. A plurality of working rolls are provided adjacent the opener roll and are configured for forming at least one nip zone between the working rolls and the opener roll. At least one motor drives the opener roll and the working rolls, and the opener roll and the working rolls are configured to open the carpet backing into fibrous portions in the nip zone.

The roller opener may further include a conveyor and/or a suction receiver that receives and transports the fibrous portions. Additionally, an inclined conveyor may be provided that transports the carpet backing to the intake of the roller opener.

Fibers can also be subjected to high pressure air, condensers, and/or a self-contained ultrasonic cleaning system which uses fluid for ultrasonically cleaning the fibers. The fibers can thereafter be subjected to drying and transported for extrusion, baling, etc.

BRIEF DESCRIPTION OF THE DRAWINGS

The foregoing, as well as other objects of the present invention, will be further apparent from the following detailed description of the preferred embodiment of the invention, when taken together with the accompanying specification and the drawings, in which.

DESCRIPTION OF THE PREFERRED EMBODIMENT

Figure 1A:
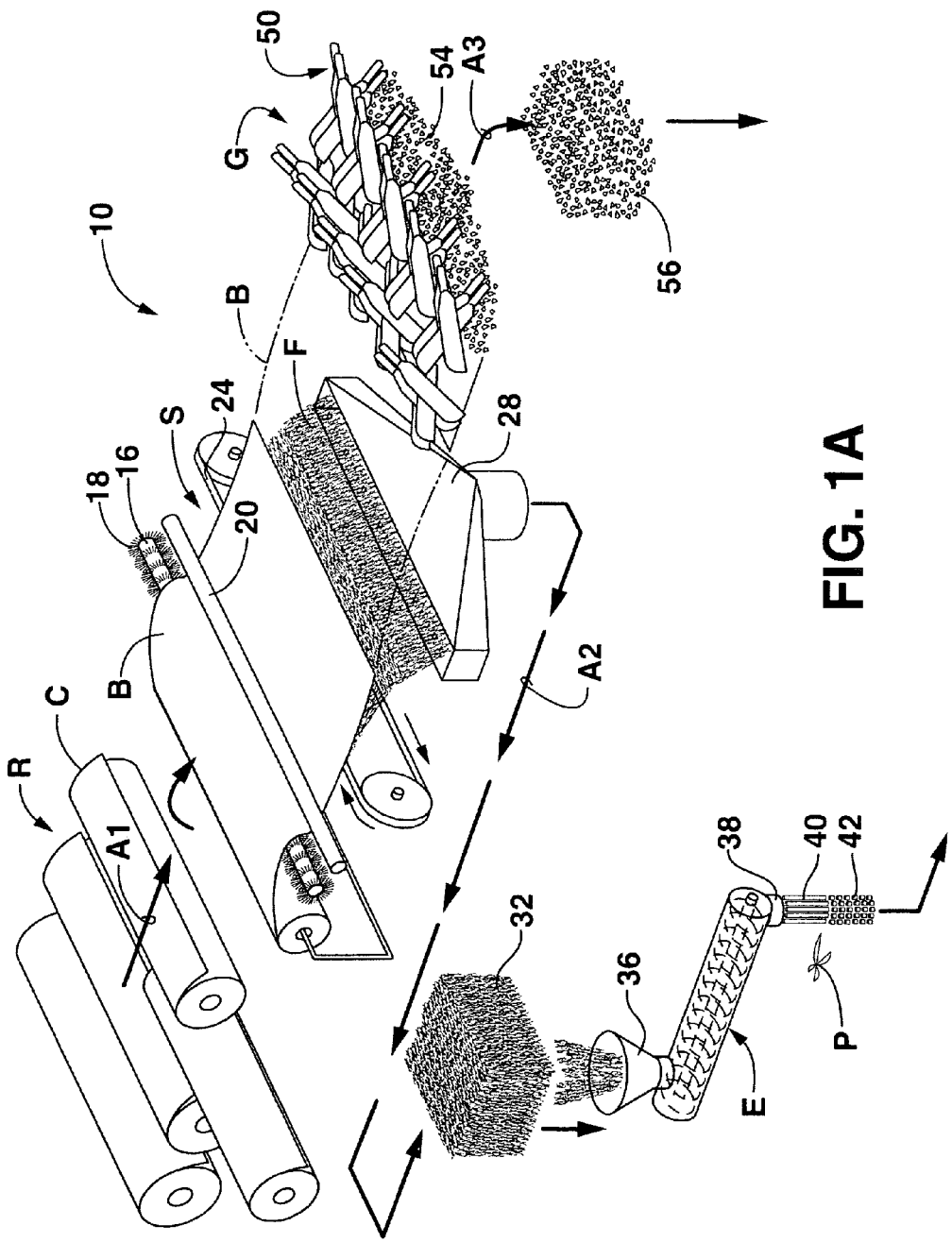
FIG. 1A is a schematic representation of a first embodiment of a carpet reclamation system constructed in accordance with the present invention illustrating carpet backing, after the fibers are separated therefrom, being fed to a granulator.

The foregoing, as well as other objects of the present invention, will be further apparent from the following detailed description of the preferred embodiment of the invention, when taken together with the accompanying drawings and the description which follows set forth this invention in its preferred embodiment. However, it is contemplated that persons generally familiar with fiber reclamation will be able to apply the novel characteristics of the structures illustrated and described herein in other contexts by modification of certain details. Accordingly, the drawings and description are not to be taken as restrictive on the scope of this invention, but are to be understood as broad and general teachings.

Referring now to the drawings in detail, wherein like reference characters represent like elements or features throughout the various views, the carpet reclamation system of the present invention is indicated generally in the figures by reference character 10.

Turning to FIG. 1A, one preferred embodiment of carpet reclamation system 10 is shown. Post-consumer carpet-(shown in FIG. 1A for example purposes in the form of rolls, generally R, supported for rotation on a support), such as broadloom carpet or other carpet, is fed in the direction of arrow A1 to a fiber separation machine, generally S. It is to be noted that in addition to post-consumer carpet in the form of rolls being fed into separation machine S, post-consumer carpet, or other carpet, in other forms, such a pieces, carpet area rugs, sections, tiles, squares, modular carpet, etc. (not shown) could also be fed into separation machine S individually manually and/or automatically. For example, modular carpet, carpet squares and/or carpet tiles could be fed into separation machine S single file, in multiple lateral and/or longitudinal rows (with respect to the direction of travel of such squares or tiles), in rows, random and/or intermittent groupings, etc. Separation machine S could be a Linta fiber separator, as manufactured by Linta Srl of Italy, although it is to be understood that other fiber separating machines could be used without departing from the disclosure of the present invention. It should be noted that carpet squares and/or tiles generally have a polyvinyl chloride (PVC) backing.

In the separation machine, or separator S, the face fibers, generally F, of a length of carpet, generally C, are separated from the backing, generally B, of carpet C. Although backing B used in connection with carpet C can be of various compositions, in one preferred embodiment, backing B is polypropylene having a latex coating thereon. A length of carpet C is fed into separator S with, as shown in FIG. 1A, the face fiber F side of carpet C facing downwardly. It is to be understood, however, that carpet C can be fed into separator S with face fiber F facing up, if desired, as shown in FIGS. 1C and 3C through 3G.

In one preferred embodiment, a dedusting system, generally D, (FIG. 3C) is provided which directs high pressure air against carpet C during the feeding of the carpet C into the separator S.

A roller 16 having brushes 18 thereon which engage face fibers F of carpet C to assist in propelling carpet C beneath a guide bar 20 and onward to presentation to a circulating knife blade, generally 24. Knife blade 24 is preferably continuously sharpened with a sharpening device (not shown) and cooled such that it does not overheat and such that it continuously presents a sharp cutting edge to sever face fibers F from backing B. As shown in FIG. 3C, two rollers 16 with brushes 18 can be provided, if desired, with one roller being above carpet C and the other roller contacting carpet C from below.

In one preferred embodiment, at least one roller has brushes and another roller 16 does not. For example, in FIG. 3C, the roller 16 on the upper side, i.e., on the side of the fiber pile of carpet C, and could have brushes, and the roller on the bottom, or backing, side of carpet C could be a roller 16 without brushes. Alternately, this configuration could be reversed, with the brushed roller 16 being on the bottom side, and the non-brushed roller being on the upper side of carpet C.

As shown in the FIG. 1A embodiment, after face fibers F are separated from backing B, they are sucked into a chute, or plenum, 28, and then follow arrows A2 to a baling operation wherein a bale press (FIG. 4) is used, if desired, to form a package, or bale, of fibers, generally 32, from fibers F. In this case, such bales 32 would subsequently be opened, i.e., the fibers removed from the bales 32, and subjected to a suction flow, wherein the detached fibers are pulled into a hopper 36 of an extruder, generally E. Alternately, face fibers F can be separated from backing B, suctioned through chute 28, and presented to hopper 36 without being baled in the interim, if desired. It is to be understood that packages or bales 32 could be of any desired shape and are not limited to the generally rectangular shape illustrated.

Upon being fed into extruder E, fibers F are compacted and forced to flow through spinneret and/or die, generally 38, at the outlet of extruder E, which forms extrusions, such as extruded rods, bars, etc., generally 40, from the melted face fibers F. A cutter, and/or pelletizer, shown functionally and designated generally as P, then cuts extrusions 40 into pellets 42. Such pellets can be used in subsequent manufacturing processes and are preferably of relatively high quality polymer, such as nylon, olefin, polyester, acrylic, etc. Such polymer pellets 42 can be used, for example, in molding operations for injection molding, composite molding, rotational molding purposes, and/or for other purposes such as being reformed into fibers through re-melting and passing through a spinneret, etc. Such pellets could also be sold and traded as a commodity on a raw material basis for use in other manufacturing, industrial, and/or commercial applications.

FIG. 1A also illustrates the separation of backing B of carpet C from face fibers F and the subsequent processing of backing B. Backing B, after having face fibers F separated therefrom, in one embodiment may pass through a shredder, cutter, chopper, granulator, etc., referred to herein collectively as a granulator, generally G. Either polypropylene or PVC backing can by passed directly to granulator G from separator S, if desired.

Granulator G includes cutters, generally 50, which chop and/or grind backing B into flakes, chips, fragments, bits, or particles, generally 54, which, as indicated by arrow A3, can be compressed and formed into bales 56 using a bale forming machine, or bale press, (FIG. 4) although it is to be understood, as discussed above, that portions, fragments, bits, pieces, chips or particles 54 can by-pass the bale forming step and pass, unbaled, to an opening and dedusting step, wherein the pieces 54 are shred, torn, and/or subjected to dust removal and ultimately become fibers and/or fibrous material finding particular use as fibers to be blended in a non-woven article and/or material production line.

If desired, however, after baling, pieces 54 can be sold in bale form 56 to be subsequently used in other processes and/or products, deposited in a landfill or otherwise disposed of. Even if such bales are disposed of in a landfill, the amount of landfill volume consumed by such de-fibered backing material alone, when in a compressed and/or baled configuration, would be significantly less than if such post-consumer carpet had been dumped in the landfill without performing fiber reclamation and fiber compression as contemplated by the present invention.

Figure 2:
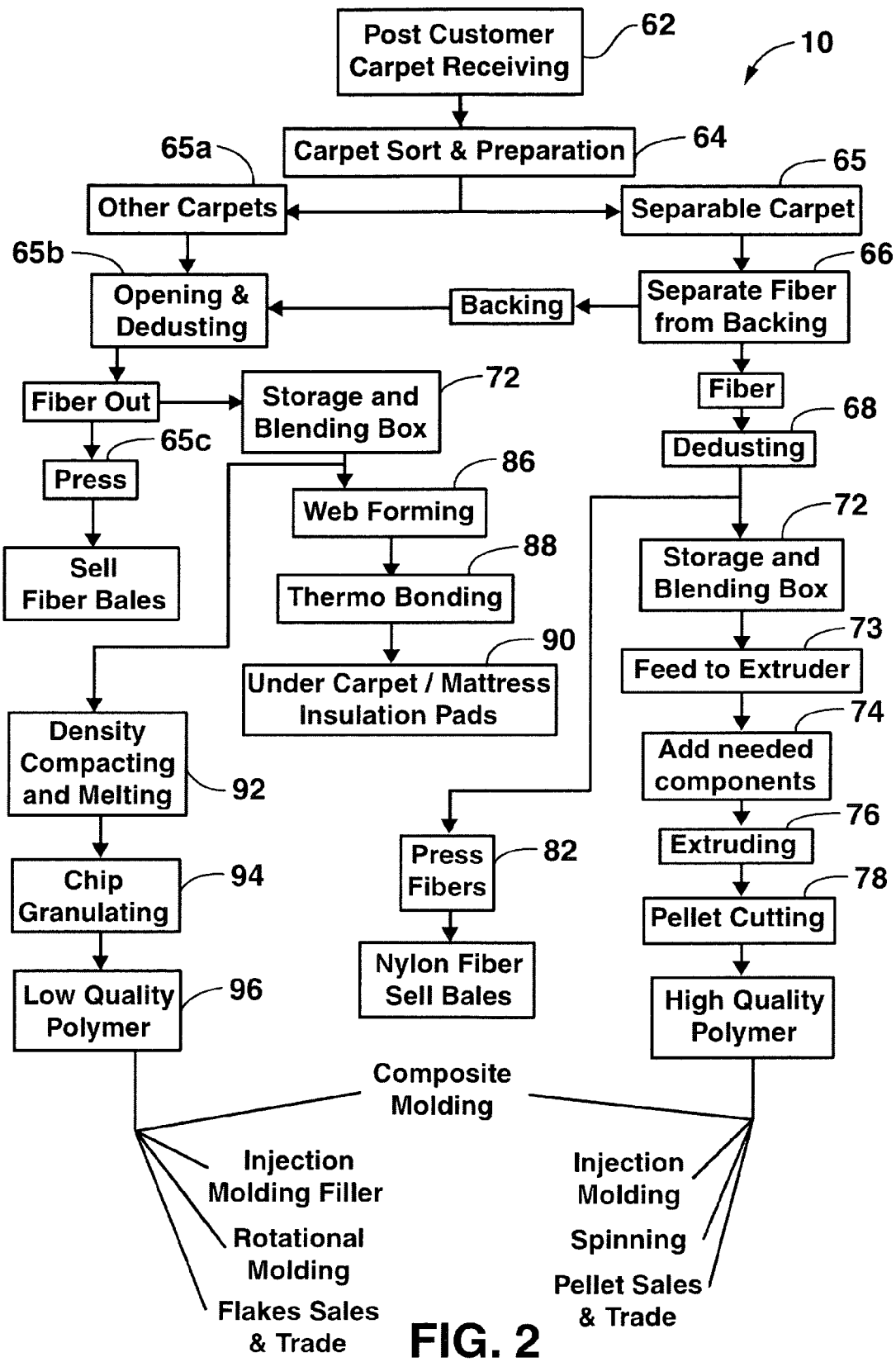
FIG. 2 is a process flow diagram of a carpet reclamation system constructed in accordance with the present invention.

FIG. 2 illustrates carpet reclamation system 10 in the form of a process chart. The initial step 62 includes post-consumer carpet being received by a facility. Such post-consumer carpet, as noted above, is carpet which has already been subjected to use in an installation or is otherwise not virgin carpet. Such post-consumer carpet could come from a variety of commercial, industrial, governmental, residential, etc. sources. After receipt at the facility, the post-consumer carpet is sorted in step 64 by face fiber type to facilitate fiber reclamation of similar types of face fiber during a particular batch reclamation process. As noted above, carpet typically includes, generally, face pile or face fiber and a backing system comprised of a polypropylene substrate with latex adhesive backing for holding the face fibers in place. In one preferred embodiment, carpet rolls R and/or carpet pieces are automatically transported to fiber separation machine S through use of conveyors, robots, tracks, or other suitable material handling devices.

It is to be understood that step 64 could include the use of an infrared sensor (not shown), such as an infrared spectrometer, which assists in classification of the post-consumer carpet face fiber prior to reclamation. When using such a sensor, and a Fourier transform process, an infrared spectra may be produced based on a particular piece of post-consumer carpet. Such produced spectra is then compared with a library of infrared spectra of other known materials, and this comparison can ultimately yield the chemical structure of the post-consumer carpet face fiber in order to facilitate sorting thereof. For example, post-consumer carpet may be sorted by face fiber type, which could be Nylon 6, Nylon 66, polyester, polypropylene, etc.

For carpet 65 having fibers wherein it is desirable and/or advantageous to separate face fibers F from backing B, such fibers F are so separated in step 66. In the case of other carpets 66, the fibers and backing of such carpets are opened together and dedusted in step 65b, which could include use of roller opener 200 and/or granulator G. This combination of fibers from the backing and pile fibers may then be compressed by a press in step 65c and baled. Alternately, such combined backing and pile fibers may proceed to a storage and blending box 72.

The fibers F separated from carpet 65 are dedusted and/or cleaned in step 68, which may include use of a willow cleaner, and then are transported on to a holding and/or storage and blending box 72. From box 72, the fibers F may be fed in step 73 to extruder E, and then any needed components, chemicals, agents, formulations, etc. may be added in step 74 and extrusion conducted in step 76. Subsequently, the extruded material may be cut into pellets or some other configuration in step 78, resulting in relatively high quality polymer, which can subsequently be sold in bulk, molded, spun, etc.

Alternately, after the dedusting step 68, fibers F can be compressed into bales in step 82 and sold in the form of nylon fiber bales. It is to be understood that the bales could be of some other fiber, if desired. Also, the fibers F could be subjected to cleaning, such as by high pressure air, condensers, and/or a self-contained ultrasonic cleaning, as discussed below.

Returning to the fiber separation step 66, after fiber separation, backing B may be subjected to opening and dedusting step 65b. The backing portions and/or fibers output from step 65a may then follow steps 65b and 65c, discussed above, and/or pass to the holding and/or storage and blending box 72. From box 72, the backing portions and/or fibers may be formed into a web in step 86 and thermobonded in step 88 for use products such as under carpet and/or mattress insulation pads in step 90.

Alternately, from box 72, the backing portions and/or fibers may be subjected to density compacting and melting in step 92, and the granulated in step 94 for output as relatively low quality polymer 96 suitable for processes such as composite molding, injection molding filler, rotational molding, and/or sale as flakes.

Returning to step 92, such density compaction and melting of the backing portions (polypropylene, PVC, etc.) and/or fibers may involve use of a conglomerator, generally 97 (FIG. 4), such as manufactured by Italrec Srl of Italy. During this step, the backing portions and/or fibers are heated using a heat source, which could be electric resistance heat, gas-fired heat or heat from another combustion source, solar heat, microwave energy, chemical reaction heat, etc., provided conglomerator 97 for inputting heat thereto, such heat serving to melt the material into a flowable state. The latex and other adhesive components still remaining on the material are essentially baked off, cooked off, volatized and/or otherwise removed therefrom from the heat input by the heat source, thereby purifying such material. The melted mass of material exiting conglomerator 97 is then allowed to cool and is subsequently granulated in step 94, resulting in polymer 96.

Figure 3A:
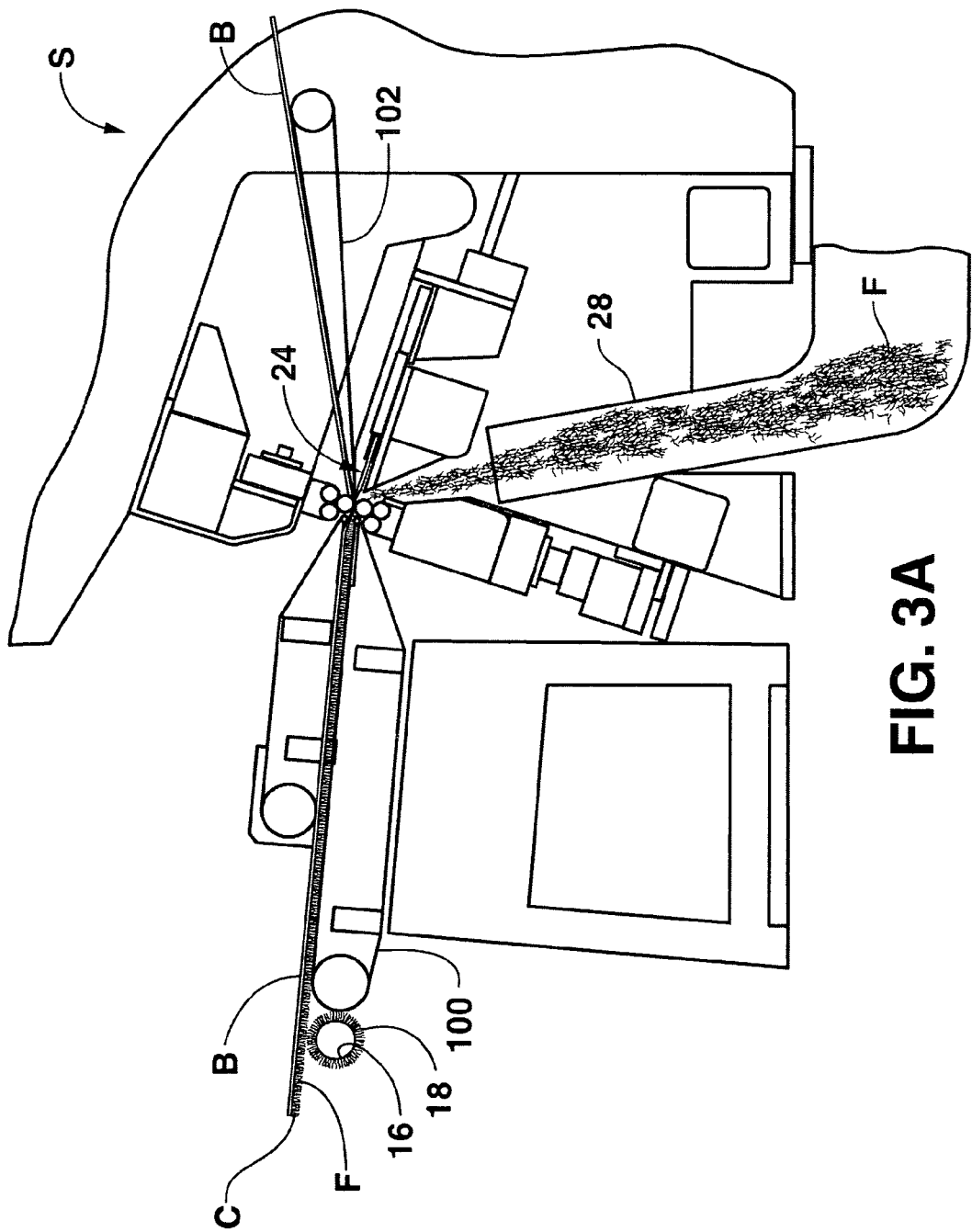
FIG. 3A is a side elevational view of a carpet reclamation system constructed in accordance with the present invention, wherein post-consumer carpet is fed face fiber side-down into a separator, the face fibers are separated from the backing and drawn away via suction, and the backing is drawn away by a conveyor belt.

FIG. 3A illustrates separator S separating face fibers F from backing B of carpet C. In the embodiment illustrated in FIG. 3A, carpet C is fed fiber side down through use of intake roller 16 having brushes 18 thereon, and also through use of a conveyor, generally 100. As fibers F are separated from backing B, they are subjected to a suction flow downwardly through chute or plenum 28, and carpet backing B is carried away via a conveyor 102.

Figure 3B:
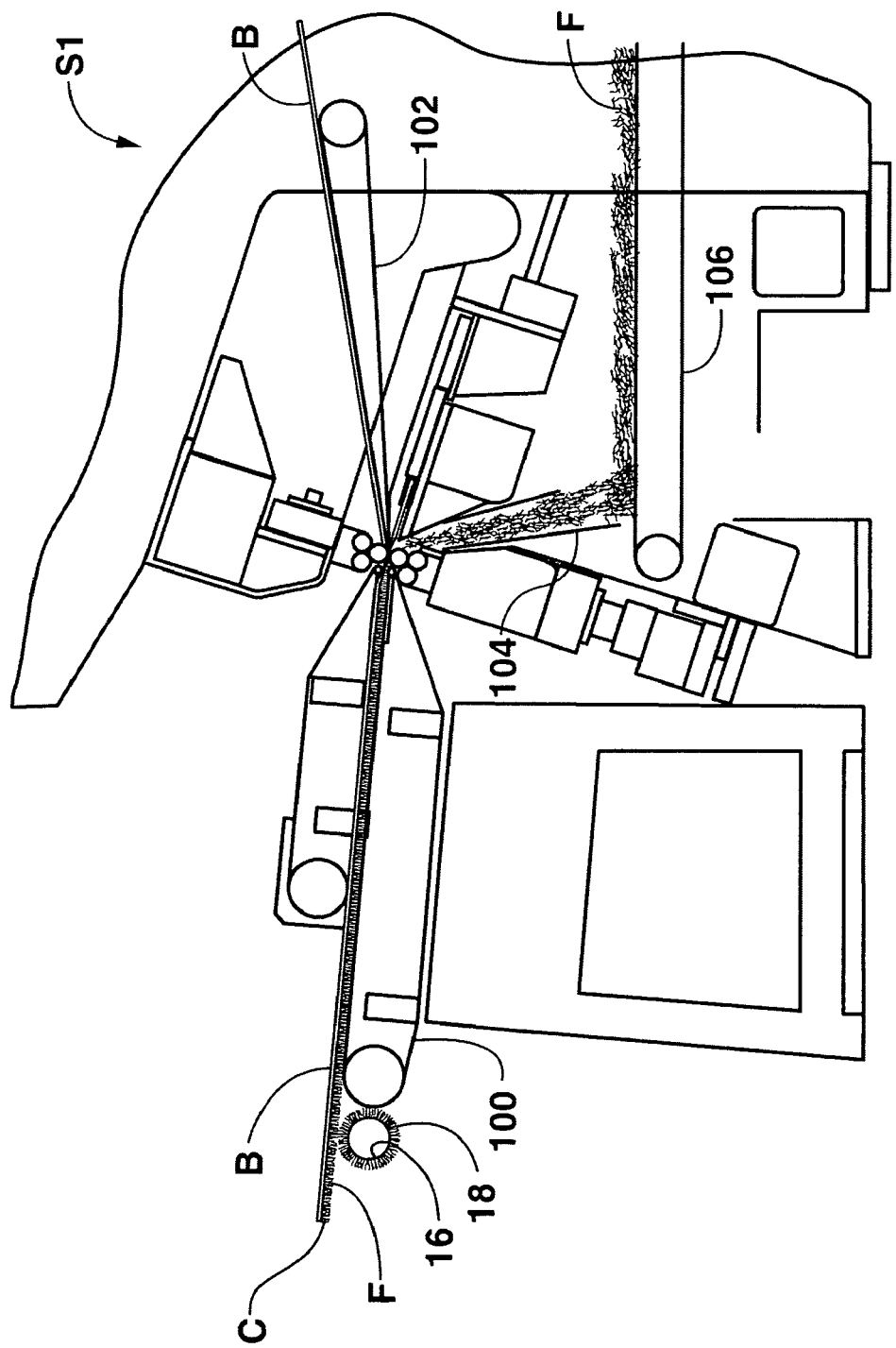
FIG. 3B is a side elevational view of one preferred embodiment of a carpet reclamation system constructed in accordance with the present invention, wherein post-consumer carpet is fed face fiber side-down into a separator, the face fibers are separated from the backing and dropped downwardly onto a moving conveyer belt, and the backing is drawn away by a conveyor belt.
Figure 3C:
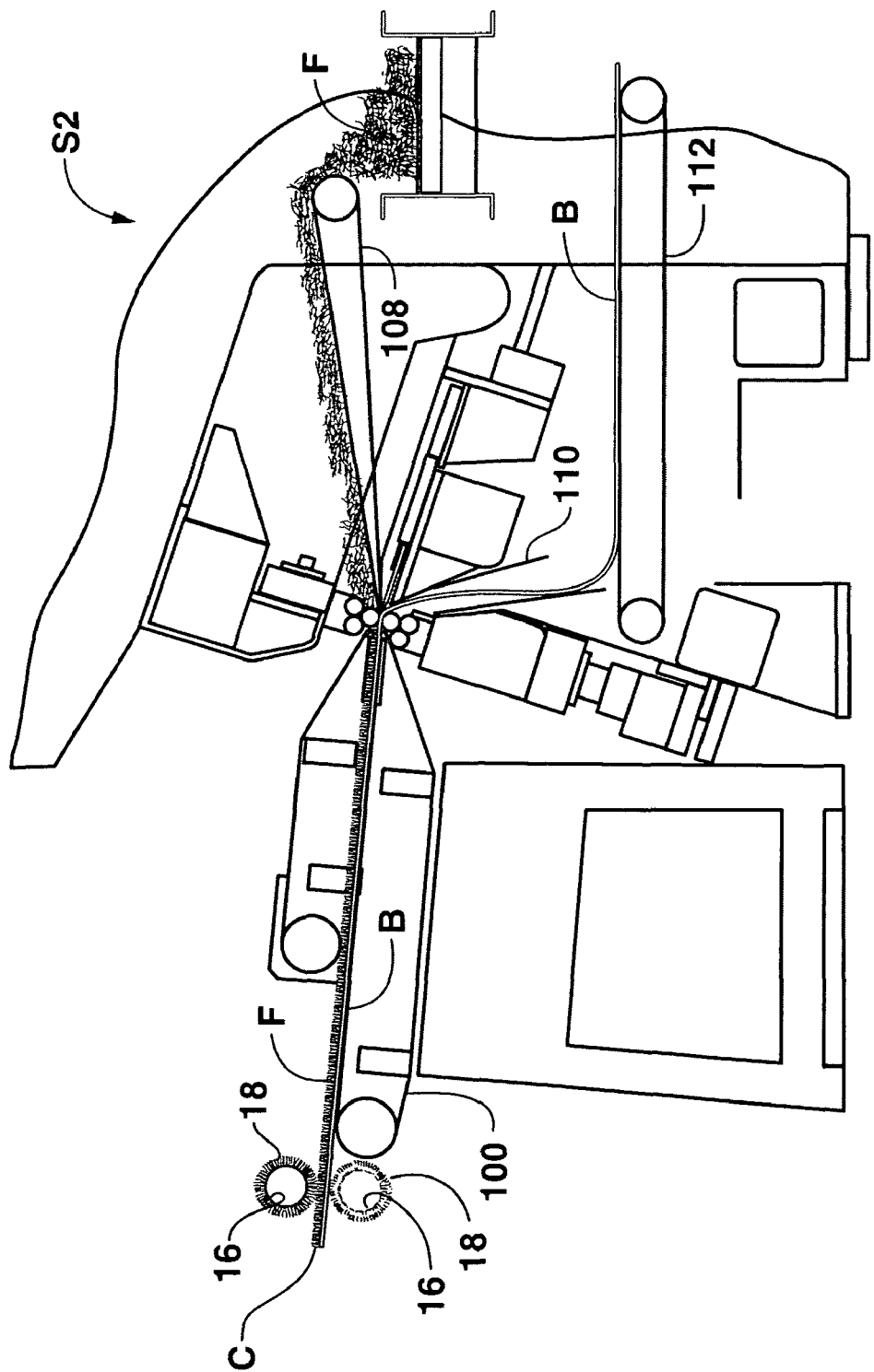
FIG. 3C is a side elevational view of one preferred embodiment of a carpet reclamation system constructed in accordance with the present invention, wherein post-consumer carpet is fed face fiber side-up into a separator, the face fibers are separated from the backing and drawn away via a conveyor belt, and the backing is drawn away by a conveyor belt.

FIG. 3B illustrates an alternate embodiment separator S1, wherein carpet C is also fed face fiber side down. However, upon separation of face fibers F from backing B, face fibers F fall downwardly through a chute 104 via gravity and/or suction being applied thereto, and are collected on a conveyor 106 for transport away from separator S1.

FIG. 3C illustrates a second alternate embodiment, wherein carpet C is fed face fiber side up to separator S2. Rollers 16 having brushes 18 can be positioned for engaging and propelling backing B of carpet C, and/or, positioned above carpet C such that brushes 18 engage face fiber F to assist in propelling carpet C towards the cutting blade of separator S2. After being separated from backing B, face fibers F are carried away via a conveyor 108, and backing B passes through a chute 110 and then engages a conveyor 112 where it is carried from separator S2.

Figure 3D:
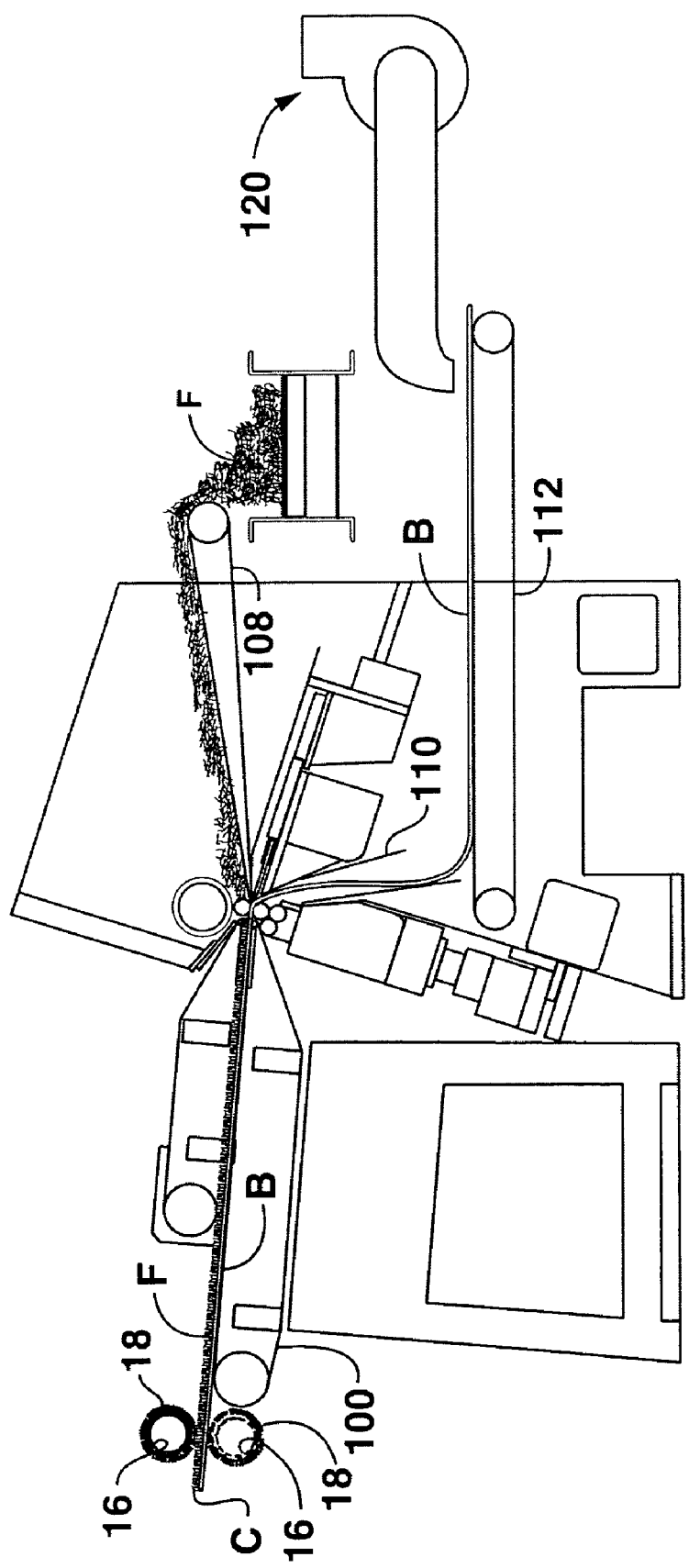
FIG. 3D is a side elevational view of one preferred embodiment of a carpet reclamation system constructed in accordance with the present invention, wherein post-consumer carpet is fed face fiber side-up into a separator, the face fibers are separated from the backing and drawn away via a conveyor belt, and the backing is drawn away by a conveyor belt, and suction is applied to the backing carried by the conveyor belt.

FIG. 3D illustrates another alternate embodiment, wherein carpet C is also fed face fiber side up. A vacuum deduster, generally 120, is provided to remove dust and particles from backing B as back B is transported by conveyor 112.

Figure 3E:
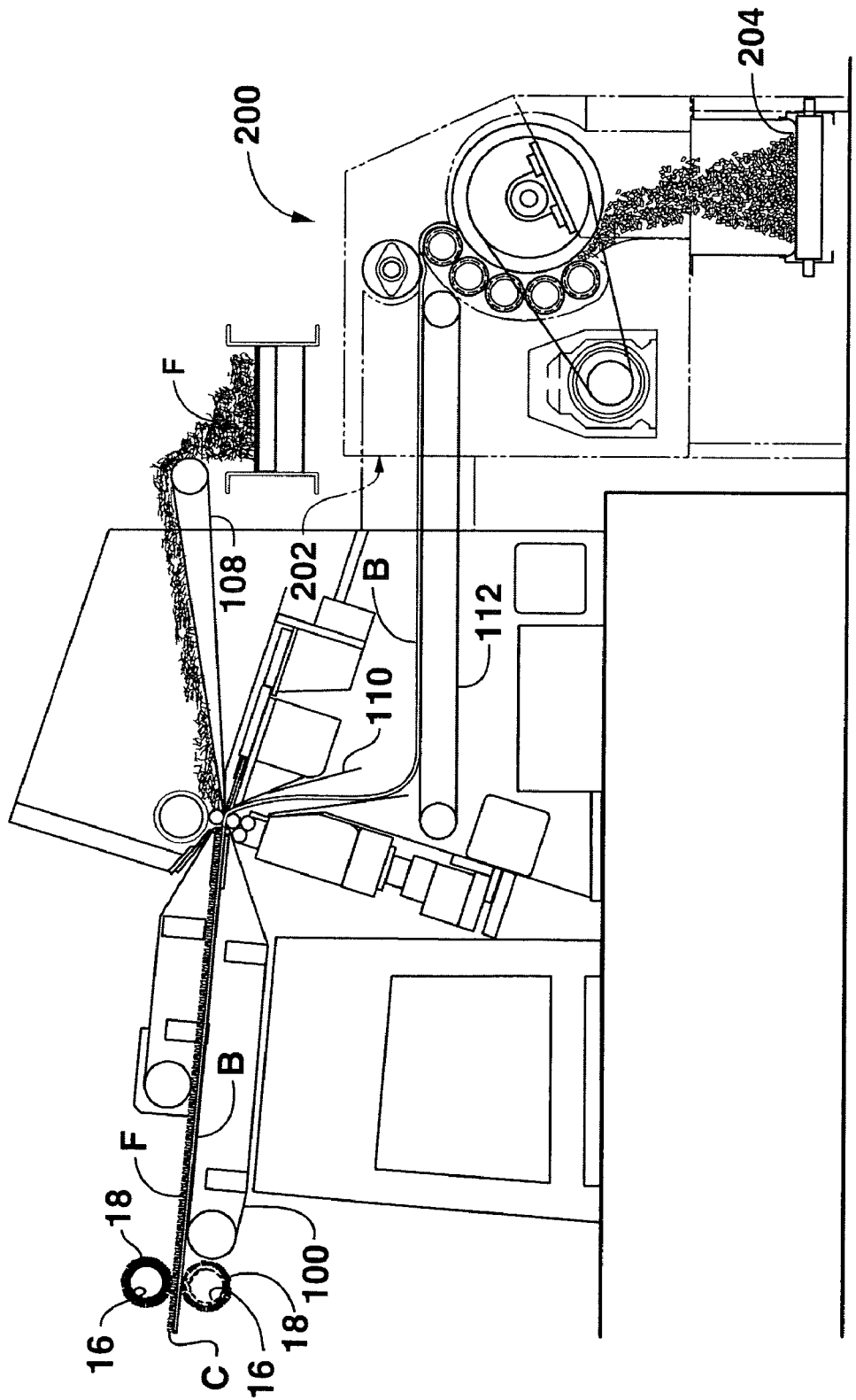
FIG. 3E is a side elevational view of one preferred embodiment of a carpet reclamation system constructed in accordance with the present invention, wherein post-consumer carpet is fed face fiber side-up into a separator, the face fibers are separated from the backing and drawn away via a conveyor belt, and the backing is drawn away by a generally horizontal conveyor belt and fed to a roller opener machine.

FIG. 3E illustrates yet another alternate embodiment of system 10, wherein carpet C is also fed to the separator face fiber side up. A roller opener, generally 200, is provided which receives backing B from conveyor 112 and opens backing B into fibrous portions and simultaneously removes dust from such fibrous portions. Conveyor 112 is at approximately the same elevation as the input 202 of roller opener in this embodiment. The fibrous portions are output by roller opener 200 to a conveyor 204 for transport to further processing.

Figure 3F:
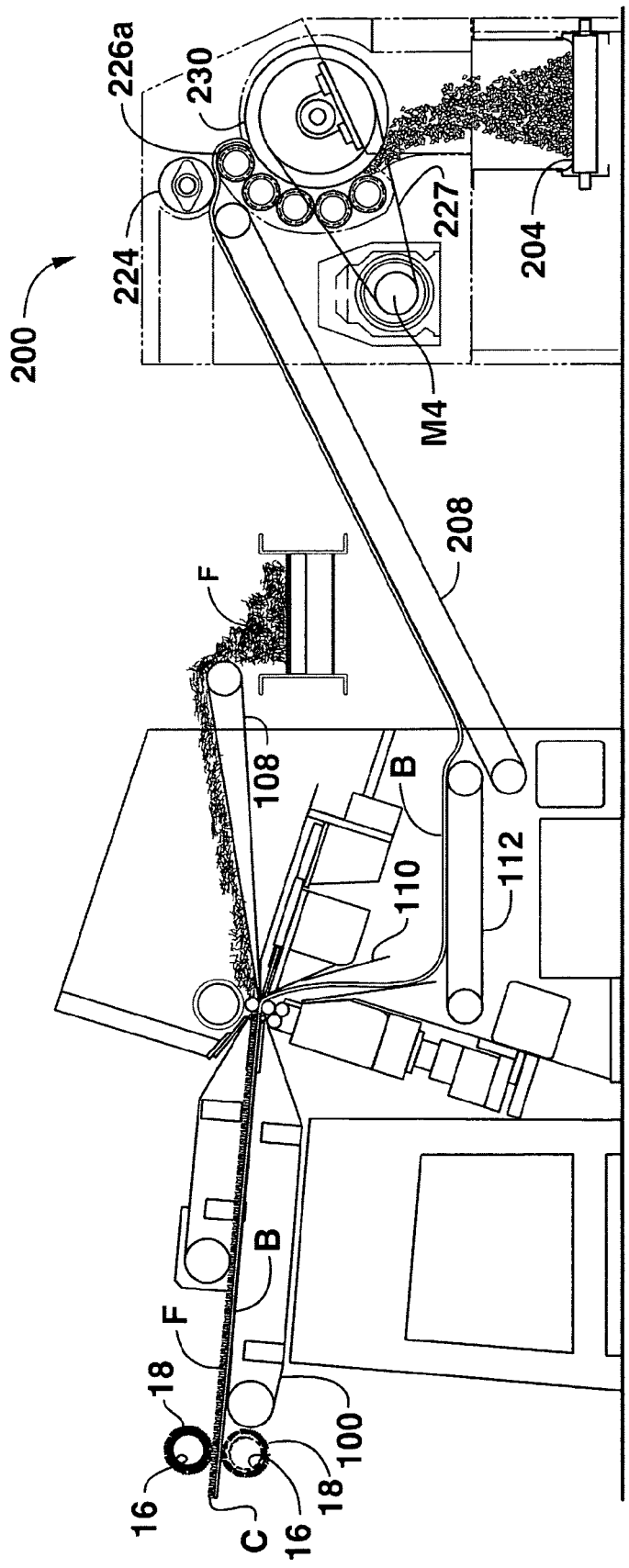
FIG. 3F is a side elevational view of one preferred embodiment of a carpet reclamation system constructed in accordance with the present invention, wherein post-consumer carpet is fed face fiber side-up into a separator, the face fibers are separated from the backing and drawn away via a conveyor belt, and the backing is drawn away by a generally angled conveyor belt and fed to a roller opener machine.

FIG. 3F illustrates still another alternate embodiment of system 10, wherein carpet C is also fed to the separator face fiber side up. Roller opener 200 receives backing B from an upwardly inclined conveyor 208, which in turn receives backing B from conveyor 112.

Figure 3G:
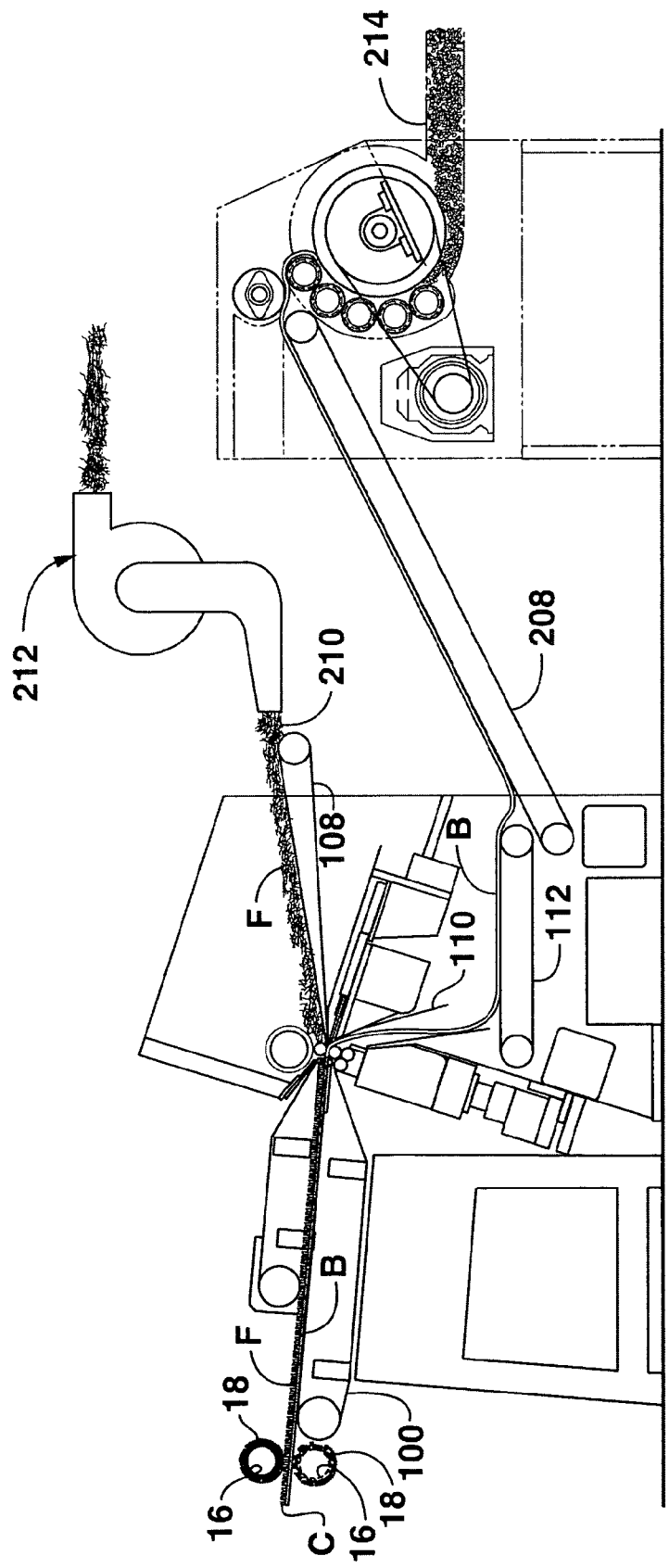
FIG. 3G is a side elevational view of one preferred embodiment of a carpet reclamation system constructed in accordance with the present invention, wherein post-consumer carpet is fed face fiber side-up into a separator, the face fibers are separated from the backing and drawn away via a conveyor belt and then to a suction feed, and the backing is drawn away by a generally angled conveyor belt and fed to a roller opener machine.

FIG. 3G illustrates another alternate embodiment of system 10, wherein carpet C is also fed to the separator face fiber side up. Roller opener 200 receives backing B from conveyor 208, which in turn receives backing B from conveyor 112. Fibers F are transported, after separation from carpet C, via a conveyor 108 to a suction input 210 and transported therefrom pneumatically by blower 212. The fibrous portions discharged from roller opener 200 are also transported pneumatically through chute 214.

Figure 1B:
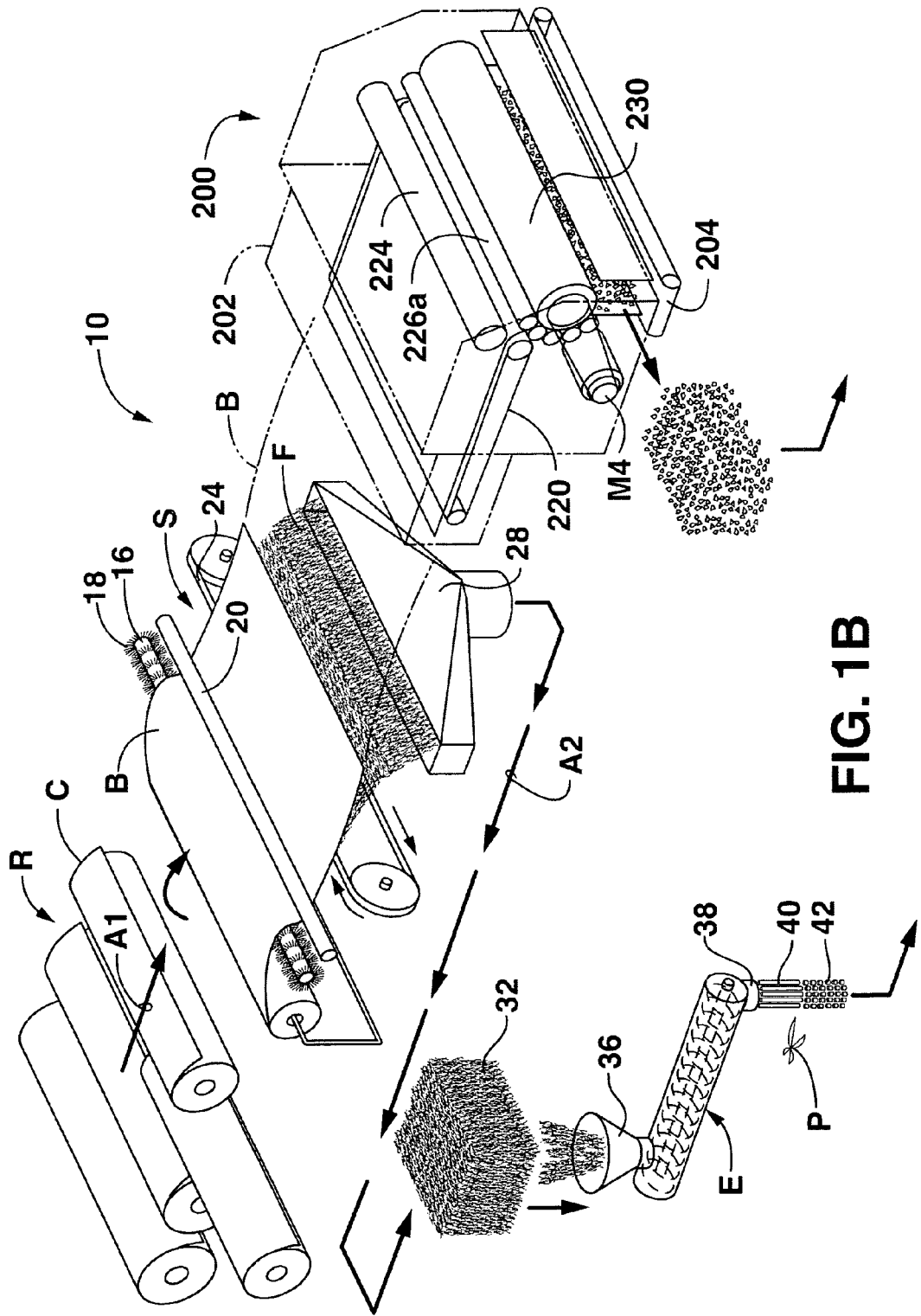
FIG. 1B is a schematic representation of a second embodiment of a carpet reclamation system constructed in accordance with the present invention illustrating carpet backing, after the fibers are separated therefrom, being fed to a roller opener machine, the output of which being fed to a conveyor.

FIGS. 1B, 1C, 3E, 3F, 3G, 4, and 5A through 7B illustrate use of a roller opener device 200 in addition to, or instead of, granulator G in system 10 for processing backing B. Roller opener 200, as shown in FIG. 1B, is inserted in place of granulator G (FIG. 1A) downstream of separator S, and processes backing B into opened fibrous portions which are deposited on a conveyor. Such fibrous portions are dedusted in roller opener 200 and can be compressed into bales or transported to subsequent processing, such as for formation into a web and/or compacted and melted and ultimately formed into chips, as discussed above and as shown in FIG. 2. In FIG. 1B, the input 202 of roller opener 200 is at generally the elevation of the output of backing B of separator S.

Figure 1C:
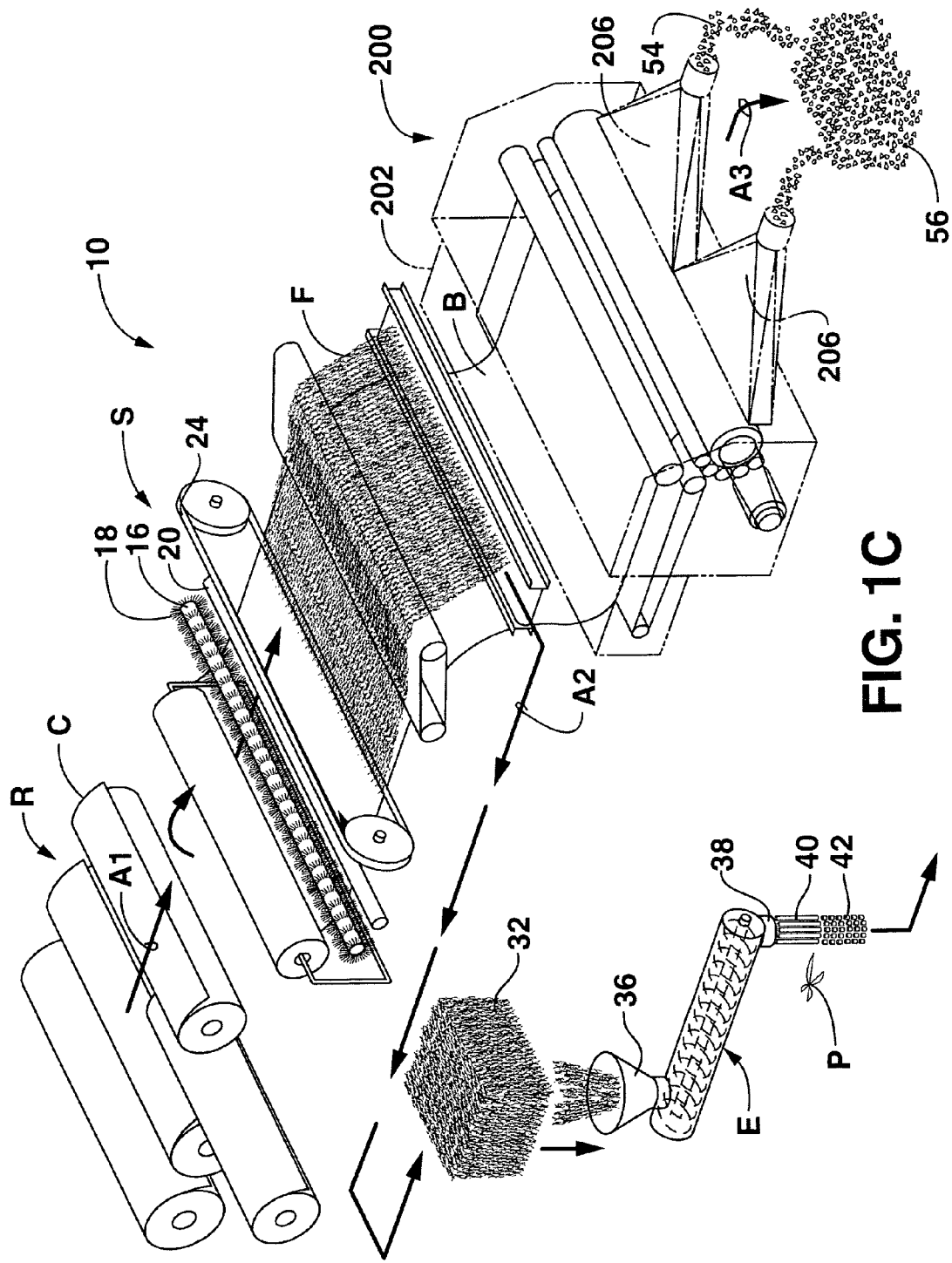
FIG. 1C is a schematic representation of a third embodiment of a carpet reclamation system constructed in accordance with the present invention illustrating carpet backing, after the fibers are separated therefrom, being fed to a roller opener machine, the output of which being fed through ducts.

FIG. 1C illustrates another preferred embodiment of system 10, wherein roller opener 200 is positioned at a generally lower elevation than separator S, and with carpet C being fed into separator S with the pile, or face fiber, side facing upwardly. Backing B moves generally downwardly after separation of fibers F and flows into the input 202 of roller opener. Fibrous portions of backing B are drawn or propelled outwardly by positive air flow or a vacuum being drawn through discharge chutes, or suction condensers, 206, and, as discussed above with respect to the embodiment in FIG. 1B, can be compressed into bales or transported for further processing.

Figure 4:
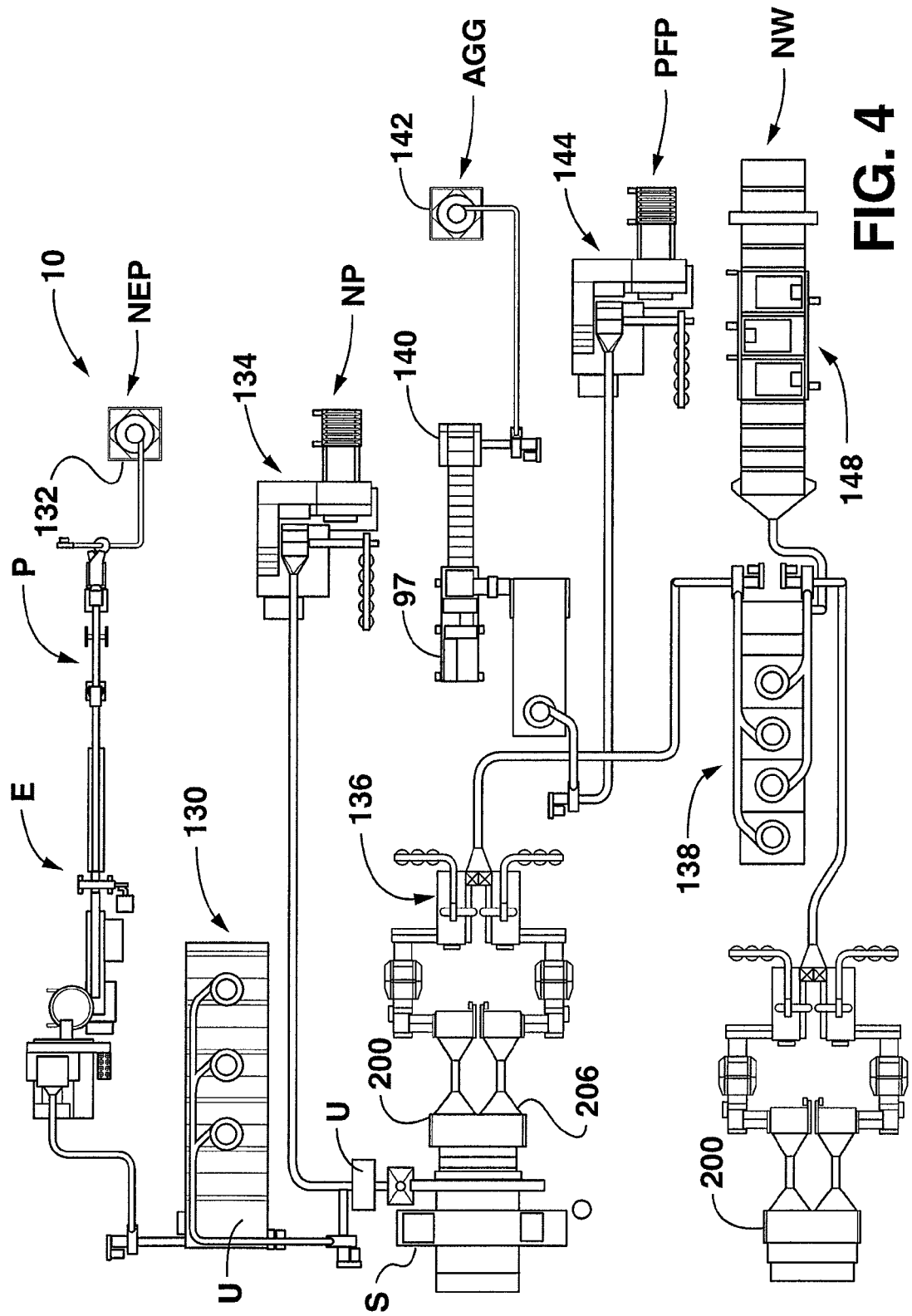
FIG. 4 is plan view of a carpet reclamation system constructed in accordance with the present invention.

FIG. 4 illustrates the machinery and process layout of one preferred embodiment of the carpet reclamation system 10 constructed in accordance with the present invention. Process lines include a nylon extrusion and palletizing line, generally NEP, a nylon fiber press line, generally NP, an agglomeration line, generally AGG, a polypropylene and/or PVC fiber press line, generally PFP, and a nonwoven line, generally NW.

Turning first to the nylon extrusion and pelletizing line NEP, carpets which have been sorted to select out those carpets with nylon pile fibers, or face fibers, are fed into the fiber separator S, and nylon face fibers separated from the carpet are pneumatically transported to a holding and/or storage and blending box, generally 130, and then on to extruder E where they are extruded. The extrusions produced by extruder E are transported to pelletizer P, and then on to a pellet collection device 132, where the pellets are loaded into Gaylord containers, bags, boxes, etc. for subsequent sale or use.

Alternately, the fibers can also be subjected to high pressure air, condensers, and a self-contained ultrasonic cleaning system, generally U, which uses fluid for ultrasonically cleaning the fibers, the fluid having a fluid cleaning system for extracting trash and/or debris therefrom. Additionally, the fibers can thereafter be subjected to drying, which may include forced-air being directed towards the fibers and/or heat being applied to the fibers and/or centrifugal drying of the fibers. The fibers can then be transported for baling, to extruder E for extrusion, etc.

Nylon fiber press line NP also receives nylon face fibers from sorted carpets, such fibers being separated from the carpets by separator S. The fibers may be transported to a self-contained ultrasonic cleaning system, generally U, and then to a deduster and fiber bale press, generally, 134 where they are dedusted and baled into bales or subsequent sale or use. Alternately, the fibers can be transported directly from separator S to deduster and fiber bale press 134.

Agglomeration line AGG includes separator S, which separates the backing from sorted carpet, the backing then proceeding to roller opener 200 (discussed in more detail below), or to granulator G, shredder, cutter, etc. (not shown in FIG. 4). The backing is opened and is cleaned and/or dedusted in roller opener 200, resulting in fibrous portions, typically polypropylene, as such material is commonly used for backing. The fibrous portions are subjected to density compaction and melting in conglomerator 97 and then to a granulator 140 for formation into chips. From granulator 140, the chips are transported to a chip collection device 142, where the chips are baled or loaded into Gaylord containers, bags, boxes, etc. for subsequent sale or use.

Polypropylene fiber press line PFP includes roller opener 200 and condensers 206, where the backing is opened into such fibrous portions and cleaned and/or dedusted. The fibrous portions then preferably pass to willow cleaners 136 for further cleaning and/or dedusting. Preferably, willow cleaners 136 include condensers, shakers, and also, an adjustable knife to remove more or less trash and/or debris from the fibrous portions. Ducting for pneumatic transport of the fibrous portions exiting roller opener 200 carries the fibrous portions to a fiber press, generally 144, where such backing fibers, typically polypropylene, are pressed and baled for subsequent sale or use in further processing operations.

For reclamation of PVC backing ordinarily used on carpet squares and/or carpet tiles, such backing, once separated by separator S, may be transported to granulator G, and then to fiber press 144, where such PVC backing fibers are pressed and baled for subsequent sale or use in further processing operations.

Nonwoven line NW can find particular use for carpets that have not been sorted and/or which are not readily sortable into particular face fiber and/or backing types. Line NW includes presenting such carpets to roller opener 200 and pneumatically transporting fibrous portions containing both face fibers and backing fibers from opener 200 through condensers 206 to willow cleaners 136, and then to storage and blending box 138 where blending of the fibrous portions may occur as desired. From storage and blending box 138, the fibers proceed, such as by pneumatic conveyance, to a nonwoven production machine, generally 148.

Alternately, after passing through willow cleaners 136, the fibrous portions can also be subjected to high pressure air, condensers, and a self-contained ultrasonic cleaning system U, discussed above, for extracting trash and/or debris from the fibrous portions. Additionally, the fibrous portions can thereafter be subjected to drying, which may include forced-air being directed towards the fibrous portions and/or heat being applied to the fibrous portions and/or centrifugal drying of the fibrous portions. The fibrous portions can then be transported to nonwoven production machine 148.

In one preferred embodiment of the carpet reclamation systems of the present invention reclaim, or recycle, post-consumer carpets up to 12 feet wide, and in another preferred embodiment, carpet between one foot and 10 feet wide.

Turning to FIGS. 5A through 7B, preferred embodiments of roller opener 200 are illustrated in various views. Roller opener 200 includes a frame, generally FR having a housing, generally H, with an intake 202 which includes an intake conveyor 220 having rolls 220a and 220b. A nip zone is formed at conveyor roll 220b and an intake roll 224 of machine 200. Backing B from carpet C is drawn into this nip zone and is thereafter worked between a plurality of nip zones between working rolls 226a, 226b, 226c, 226d, and 226e and a main roll 230.

Figure 6A:
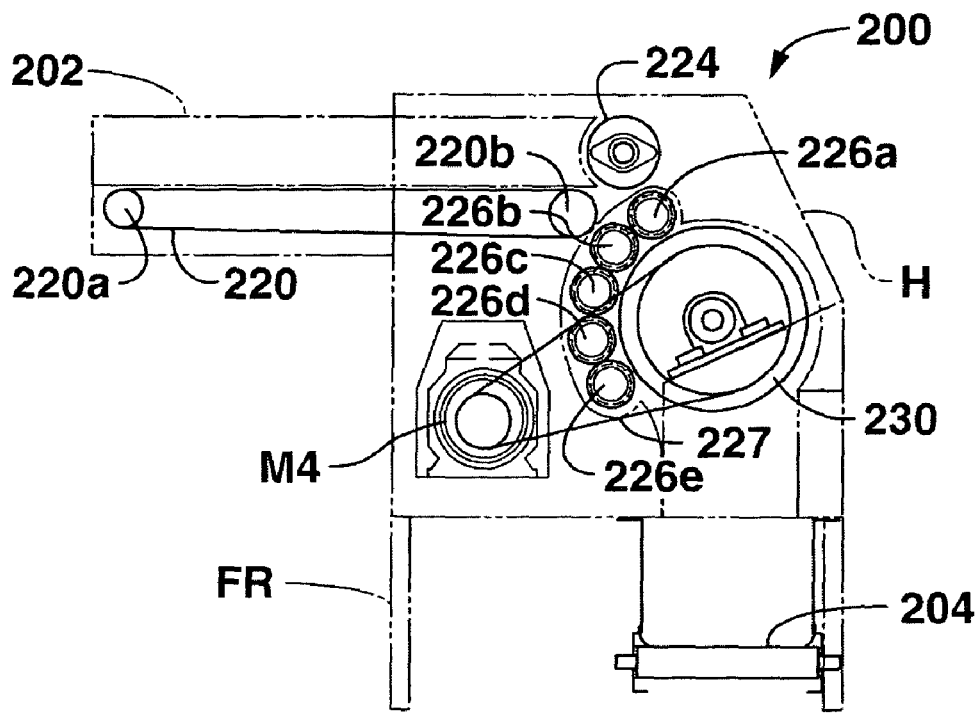
FIG. 6A is a left side elevational view of the roller opener machine constructed shown in FIG. 5A.
Figure 7A:
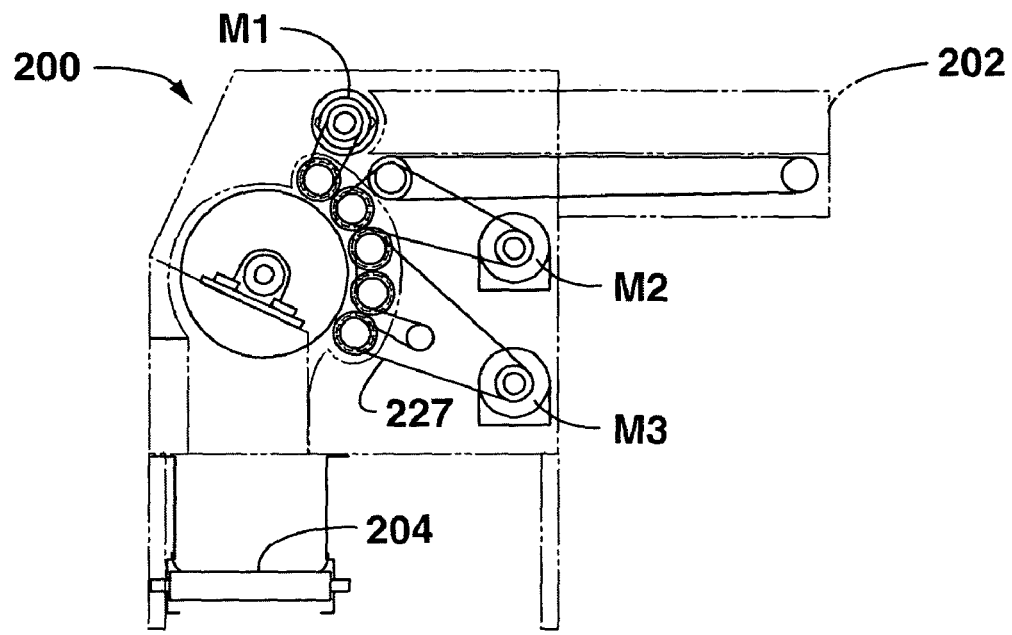
FIG. 7A is a right side elevational view of the roller opener machine shown in FIG. 5A.

As shown in FIG. 7A, roll 226a is driven, together with intake roll 224, by a motor M1, and roll 226b and roll 220b are driven by a motor M2. Rolls 226c, 226d, and 226e are driven by motor, generally M3, and main roll 230 is driven by motor M4 (FIG. 6A). Drive members, generally 227, such as belts, chains, gears (not shown), etc. can be used to transfer power from the motors to the respective rolls which they drive.

As the backing B is transported about main roll 230 and working rolls 226a-e, backing B is shredded and reduced to fibers and fibrous portions. Main roll 230 and working rolls 226 may include fiber engaging textures such as teeth, wire clothing, etc., as is found in textile fiber carding machines. Simultaneously, dust, dirt, debris, etc. and/or carpet backing constituents, such as carbon and calcium dust, are extracted from backing B by suction being applied to the area of rolls 226a-e, 230 and/or by gravity. Fibers and fibrous portions exiting the working area of rolls 226a-e and 230 are then allowed to fall by gravity to output conveyor 204 for transport to the various lines as discussed above, or to a collection area for storage for subsequent use and/or disposal.

Figure 5A:
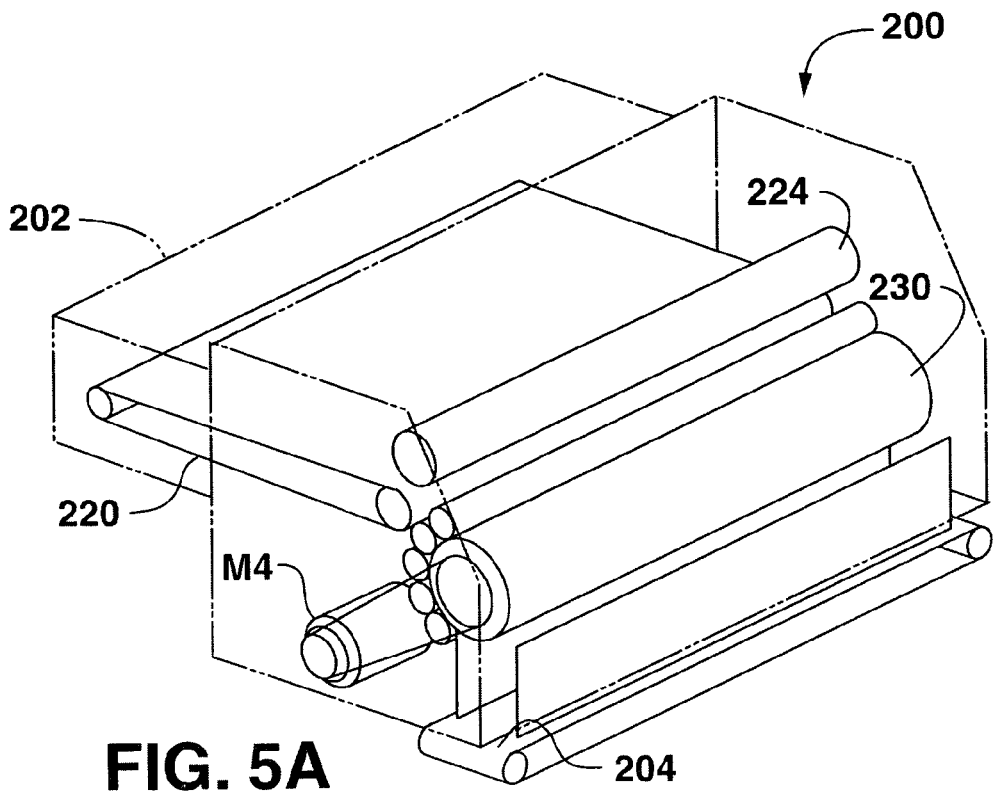
FIG. 5A is a perspective view of a first embodiment of a roller opener machine constructed in accordance with the present invention having a conveyor discharge.
Figure 5B:
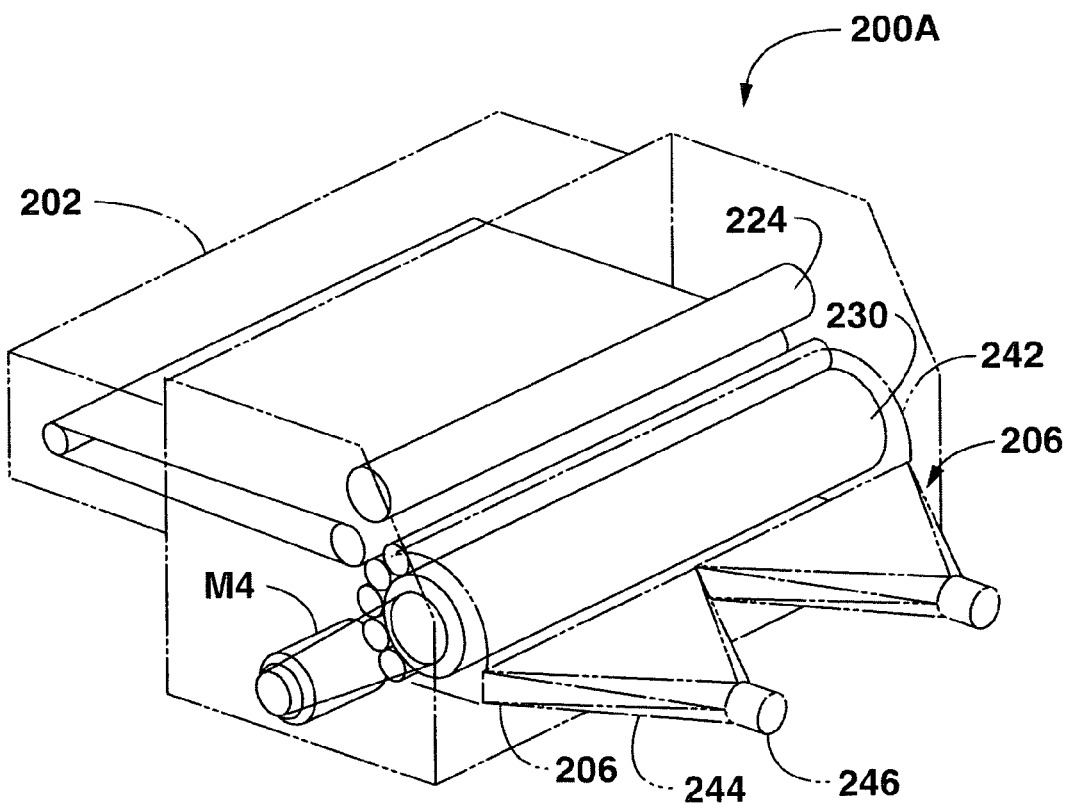
FIG. 5B is a perspective view of a second embodiment of a roller opener machine constructed in accordance with the present invention having a suction discharge.
Figure 6B:
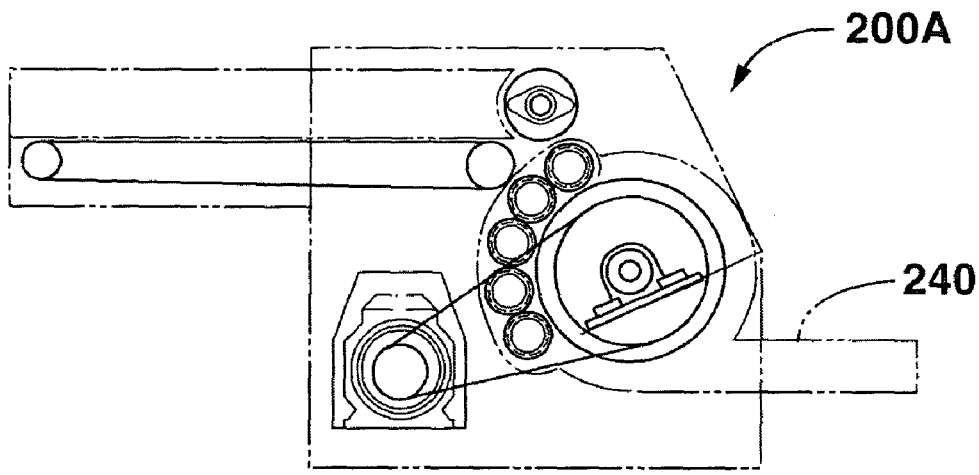
FIG. 6B is a left side elevational view of the roller opener machine shown in FIG. 5B.
Figure 7B:
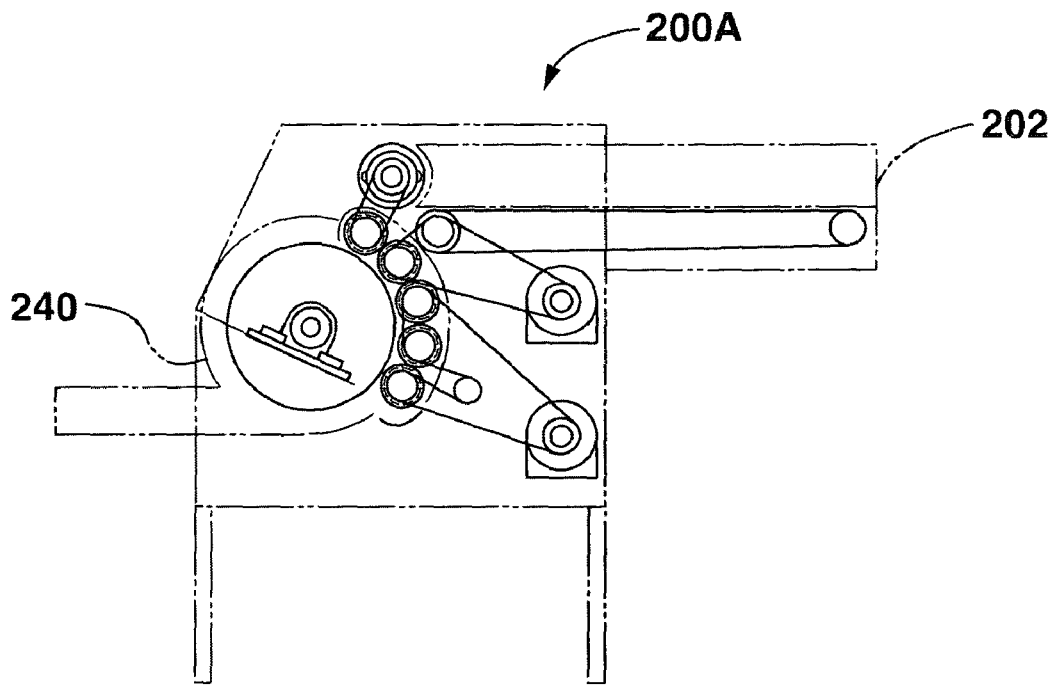
FIG. 7B is a right side elevational view of the roller opener machine shown in FIG. 5B.

FIGS. 5B, 6B, and 7B illustrate an alternate embodiment roller opener 200A, which is essentially the same as roller opener 200, except roller opener 200A includes a pneumatic discharge for transporting fibers and fibrous portions after backing B has been worked by rolls 226a-e and main roll 230. A centrifugal blower, generally 240, is provided for suctioning off backing fibers and fibrous portions from the working area of rolls 226a-e and roll 230. A suction plenum, generally 242, is provided having suction receivers, or condensers, 206 with transitions 244 for coupling to ducts 246 to transport the fibers and fibrous portions for subsequent processing, transport, collection and/or use.

From the foregoing, it can be seen that the present invention provides a system for reclaiming reusable fibers from carpets on an automated production basis.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. An improved method for processing post-consumer carpet to recycle one or more component materials of said post consumer carpet, said method comprising:

supporting one or more rolls of said post consumer carpet on a support for rotation of said one or more rolls thereon;

feeding one end of said roll of post-consumer carpet face down into an intake comprising one or more rollers;

classifying said roll of post-consumer carpet according to chemical structure of face fiber by using an infrared spectrometer and a Fourier transform process to produce a spectra for said roll of post-consumer carpet; and comparing said spectra of said roll of post-consumer carpet to a library of spectra of known materials for determining said chemical structure;

dedusting of said post consumer carpet by one or more of: directing high pressure air at said carpet during said feeding by blowing air from a centrifugal blower; and vacuum dedusting of said post-consumer carpet;

propelling said carpet into a separator using a first roller being brushless and a second roller having brushes thereon; said brushless roller being above said post-consumer carpet and contacting said backing, and said second roller being below said post-consumer carpet with said brushes engaging said face fiber to cause said propelling of a portion of said roll of post-consumer carpet beneath a guide bar; driving of one or more of said first and second rollers being by transferring power from a motor;

separating face fiber of said post-consumer carpet by a circulating knife blade of said separator severing face fiber from backing material; sharpening said circulating knife blade continuously using a sharpener to continuously present a sharp cutting edge for said severing; and cooling of said continuously sharpened circulating knife blade to thereby prevent overheating;

permitting said separated face fiber to fall into a chute for transport, said face fiber falling by one or more of: gravity free falling; and vacuum-assisted falling;

dedusting of said separated face fiber using a willow cleaner;

cleaning of said separated face fiber to extract debris therefrom using one or more of: a source of high pressure air; a vacuum condenser; and a self-contained fluidic ultrasonic cleaner, said self-contained ultrasonic cleaner comprising a fluid cleaning system for extracting dust and/or debris from said cleaning fluid;

drying of said cleaned face fiber using one or more of: forcing air upon said cleaned face fiber; applying heat to said cleaned face fiber; and drying in a centrifugal dryer;

transporting of said cleaned face fiber pneumatically through a chute for baling of said cleaned face fibers by a baler;

storing of said baled face fiber according to said classified chemical structure;

feeding of said stored bales, for one of said classified chemical structures, into a conglomerator for heating therein to remove latex and other remaining adhesive components by volatizing said adhesive components, producing said heat using a heat source comprising one or more of: electric resistance heat; heat from a combustion source; solar heat; and microwave energy; and melting in said conglomerator of said adhesive-free face fiber into a flowable state;

feeding said flowable face fiber into a hopper of an extruder; adding one or more chemical agents to produce a high quality polymer; compacting said high quality polymer to force a flow of said high quality polymer through a die for forming an extruded shape;

cutting said extruded high quality polymer shape into pellets; and loading said pellets into one or more containers;

trading said high quality polymer pellets as a raw material commodity for use in other manufacturing operations;

carrying away of said separated backing to a granulator using a conveyor; and forming backing fragments by one or more of: shredding, cutting, and chopping of said backing; and opening of said fragments into fibers by tearing of said fragments in an opening device; and dedusting;

storing said torn backing fibers in a blending box;

transporting said stored backing fibers from said blending box to said conglomerator; and density compacting and melting of said torn backing fibers in said conglomerator to remove latex and other remaining adhesive components by volatizing said adhesive components; and granulating of said adhesive-free backing to form a low quality polymer.

2. An improved method for processing post-consumer carpet according to claim 1 further comprising forming said support for rotation of said one or more rolls by bending a rod into a U shape.

3. An improved method for processing post-consumer carpet according to claim 2 wherein said feeding of said flowable face fiber into a hopper of an extruder is by feeding said fiber into a funnel-shaped hopper.

4. An improved method for processing post-consumer carpet according to claim 3 wherein said propelling of said portion of said roll of post-consumer carpet beneath a guide bar comprises propelling said portion of said roll of post-consumer carpet beneath a cylindrically-shaped guide bar.

5. An improved method for processing post-consumer carpet according to claim 3 further comprising injection molding filler using said low quality polymer.

* * * * *